United States Patent
Nishioka et al.

(10) Patent No.: US 6,778,221 B1
(45) Date of Patent: Aug. 17, 2004

(54) APPARATUS AND METHOD FOR CONVERTING BETWEEN DIFFERENT VIDEO FORMATS

(75) Inventors: Yoshihiro Nishioka, Kawasaki (JP); Yuji Mori, Kawasaki (JP); Mitsunori Ohno, Kawasaki (JP); Yuuji Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/328,371

(22) Filed: Jun. 9, 1999

(30) Foreign Application Priority Data

Nov. 30, 1998 (JP) .......................................... 10-339009

(51) Int. Cl.[7] .......................... H04N 7/01; H04N 11/01
(52) U.S. Cl. ..................................... 348/459; 348/441
(58) Field of Search ................................ 348/459, 455, 348/446, 448, 451, 452, 445, 441; H04N 7/01, 11/00

(56) References Cited

U.S. PATENT DOCUMENTS

| | | | | |
|---|---|---|---|---|
| 4,891,701 A | * | 1/1990 | Shikina et al. | 348/443 |
| 5,428,399 A | * | 6/1995 | Robinson et al. | 348/459 |
| 5,619,272 A | * | 4/1997 | Salmon et al. | 348/452 |
| 5,642,170 A | * | 6/1997 | Hackett et al. | 348/447 |
| 5,754,248 A | * | 5/1998 | Faroudja | 348/459 |
| 5,768,536 A | * | 6/1998 | Strongin et al. | 375/240.23 |

FOREIGN PATENT DOCUMENTS

| | | | |
|---|---|---|---|
| EP | 0637889 A2 | 2/1995 | ............ H04N/7/01 |
| GB | 2263602 A | 7/1993 | ............ H04N/5/14 |
| JP | 04074082 | 3/1992 | |
| JP | 08172609 | 7/1996 | |
| JP | 08322025 | 12/1996 | |
| WO | WO 93/19557 | 10/1993 | ............ H04N/7/00 |
| WO | WO 97/46020 | 12/1997 | ............ H04N/7/28 |
| WO | WO 97/46022 | 12/1997 | ............ H04N/7/36 |

OTHER PUBLICATIONS

Vandendorpe L. et al. "Generalized Interpolators for Advanced Movement–Compensated 50HZ–60HZ Conversion of Interlaced Sequences" Proceedings of the International Conference on Image Processing (ICIP), Oct. 23–26, 1995, vol. 2, pp. 237–240.

Nojiri Y. et al. "HDTV Standards Converter" NHK Laboratories Note, No. 427, Aug. 1, 1994, pp. 1–12.

* cited by examiner

Primary Examiner—Michael H. Lee
(74) Attorney, Agent, or Firm—Staas & Halsey LLP

(57) ABSTRACT

A method and apparatus for converting between different video formats, which provide smooth video motion by eliminating unnatural effects which could be introduced in the process of video format conversion. A frame interpolator produces interpolated frames from a first video signal given in a first video format by using motion vectors of the first video signal. From the interpolated frames, a video signal generator produces a second video signal in a second video format that is incompatible with the first video format.

11 Claims, 20 Drawing Sheets

| | FRAME FREQUENCY | EFFECTIVE PELS PER LINE | EFFECTIVE LINES PER FRAME |
|---|---|---|---|
| NTSC | 30 (=30000/1001) Hz | 720 | 480 |
| PAL | 25 Hz | 720 | 576 |
| SECAM | 25 Hz | 720 | 576 |

FIG. 18
PRIOR ART

|  | | CIF | QCIF |
|---|---|---|---|
| PELS PER LINE | Y | 360 | 180 |
|  | Cr | 180 | 90 |
|  | Cb | 180 | 90 |
| LINES PER FRAME | Y | 288 | 144 |
|  | Cr | 144 | 72 |
|  | Cb | 144 | 72 |
| FRAME FREQUENCY | | 30 (=30000/1001) Hz | |

FIG. 19
PRIOR ART

APPARATUS AND METHOD FOR CONVERTING BETWEEN DIFFERENT VIDEO FORMATS

BACKGROUND OF THE INVENTION

1. Field of the Invention

The present invention relates to an apparatus and method for converting between different video formats, and more particularly, to an apparatus and method for converting between different video formats to enable visual communication between remote users of different television systems.

2. Description of the Related Art

There are three major standard television systems available today: NTSC, PAL, and SECAM. NTSC is used in the United States and Japan, while PAL and SECAM mainly in European nations. For comparison, FIG. 18 shows some key specifications of those three different video standards, including: frame frequency, the number of effective picture elements (pels or pixels) per line, and the number of effective lines per frame. Although PAL and SECAM seem to share some common parameters, SECAM is actually incompatible in operation with PAL.

As noted above, different video formats are used in different groups of nations, and to solve this incompatibility problem in international visual communications, it is necessary to introduce some standardized video coding formats. Typical video formats for such purposes are H.261 and H.263, recommendations from the International Telecommunications Union-Telecommunications Standards Sector (ITU-T). They provide two common video formats called "Common Intermediate Format (CIF)" and "Quarter Common Intermediate Format (QCIF)." Some of their key specifications are shown in FIG. 19 to make a comparison in terms of the number of picture elements per line, the number of lines per frame, and frame frequency. In this table of FIG. 19, the symbol "Y" represents luminance signals, and "Cr" and "Cb" denote color difference signals.

FIG. 20 shows a simplified system structure for international digital video communications between two countries using different television system standards. This video communications system interconnects an NTSC system 2 and a PAL system 4 by using CIF as a vehicle for relaying digital video signals via a communications satellite 3. To convert the video format, a video signal processor 200a is disposed at the NTSC side, and another video signal processor 200b at the PAL side. The former processor 200a comprises a format converter 201a and a codec (coder/decoder) 202a, while the latter processor 200b comprises a format converter 201b and a codec 202b. Such video signal processors 200a and 200b are implemented as part of videoconferencing stations or videophone terminals, for example.

Consider that the NTSC system 2 attempts to send video information to the PAL system 4. The format converter 201a in the video signal processor 200a converts incoming NTSC video signal into a CIF video stream, which conforms to the common format for communications. This CIF video stream is then encoded by the codec 202a and transmitted to the communications satellite 3 via a radio transmitter (not shown). The radio signal retransmitted by the communications satellite 3 reaches a receiver (not shown) attached to the video signal processor 200b. The video signal, now in the form of an electrical signal, is supplied to the codec 202b for video decoding, where the original CIF video stream is reconstructed. The format converter 201b converts this CIF video stream to a PAL video signal for use in the PAL system 4. It would be understood that video signal transmission in the opposite direction (i.e., from PAL to NTSC) can be achieved in a similar fashion.

As described above, conventional visual communications systems use the CIF as a common format to transport video information to remote sites. That is, the sender encodes video signals after converting from its local format to the CIF format, and the receiver converts from the CIF format to its local format after decoding reception signals. In such international video communications, conventional systems resolve the difference in frame frequencies by subsampling or duplicating video frames. More specifically, when a video signal having a certain frame frequency has to be converted to a lower frequency (e.g., 30 Hz to 25 Hz), the source frames are subsampled, or decimated, at predetermined intervals. On the other hand, when a video signal has to be converted to a higher frequency, some frames are sent twice to adjust the frame frequency.

However, the above-described video conversion techniques introduce some unnatural effects into objects' motion in a video, because of the discontinuity of frame pictures. Viewers may perceive the drop or duplication of frames as awkward motion of objects, particularly when the video contains rapid motion such as a soccer ball flying in a parabola.

SUMMARY OF THE INVENTION

Taking the above into consideration, an object of the present invention is to provide an apparatus for converting between different video formats to enable visual communications between users of incompatible television systems, which maintains the smoothness of object motions by preventing unnatural effects from being introduced in the process of video format conversion.

Further, another object of the present invention is to provide a video format conversion method for visual communications between users of incompatible television systems, which maintains the smoothness of object motions by preventing unnatural effects from being introduced in the process of video format conversion.

To accomplish the first object, according to the present invention, there is provided an apparatus for converting from a first video signal in a first video format to a second video signal in a second video format that is incompatible with the first video format. This apparatus comprises: a frame interpolator which produces interpolated frames from the first video signal by using motion vectors obtained therefrom; and a video signal generator which produces the second video signal from the interpolated frames.

To accomplish the second object, according to the present invention, there is provided a method of converting from a first video signal in a first video format to a second video signal in a second video format that is incompatible with the first video format. This method comprises the steps of: producing interpolated frames from the first video signal by using motion vectors obtained therefrom; and producing the second video signal from the interpolated frames.

The above and other objects, features and advantages of the present invention will become apparent from the following description when taken in conjunction with the accompanying drawings which illustrate preferred embodiments of the present invention by way of example.

Figure 16:
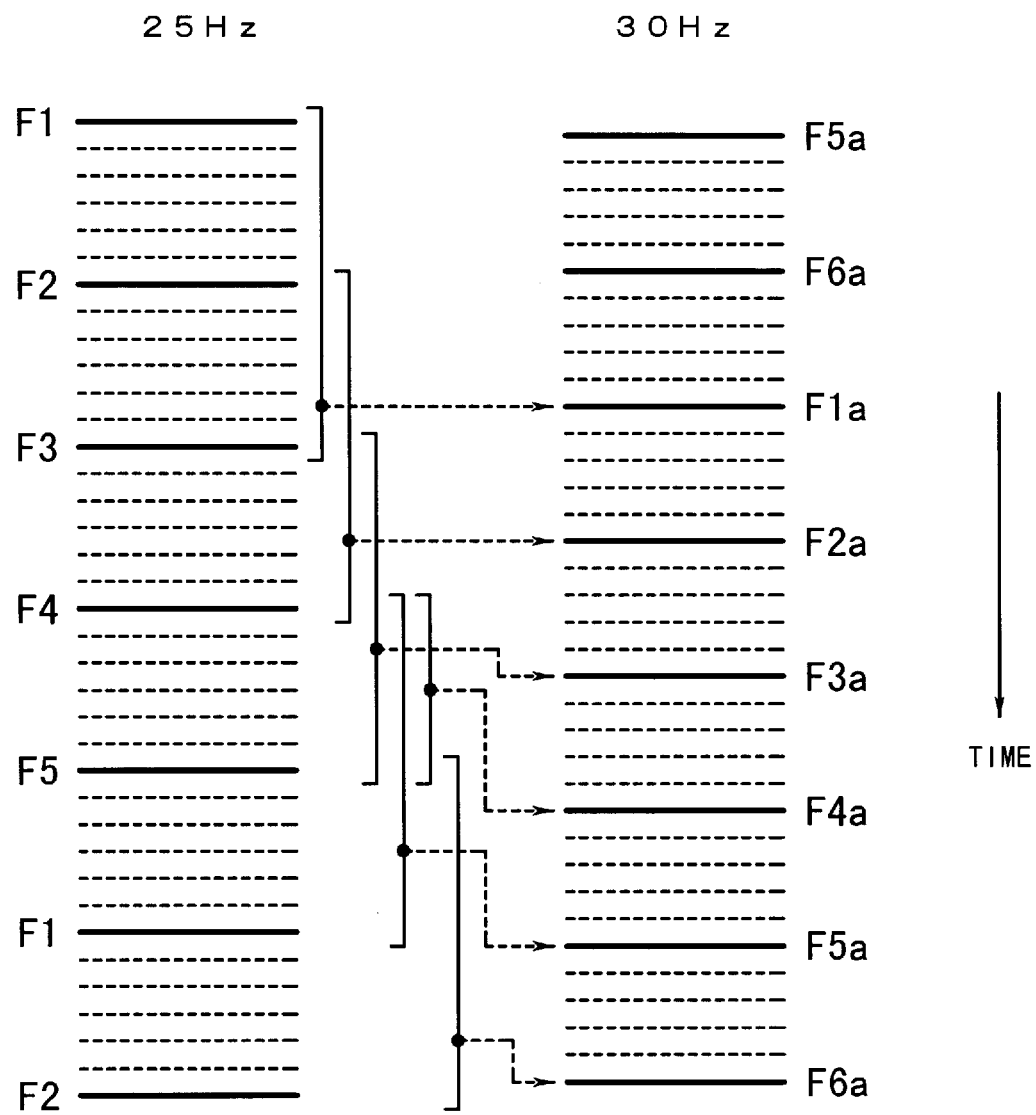
Figure 17:
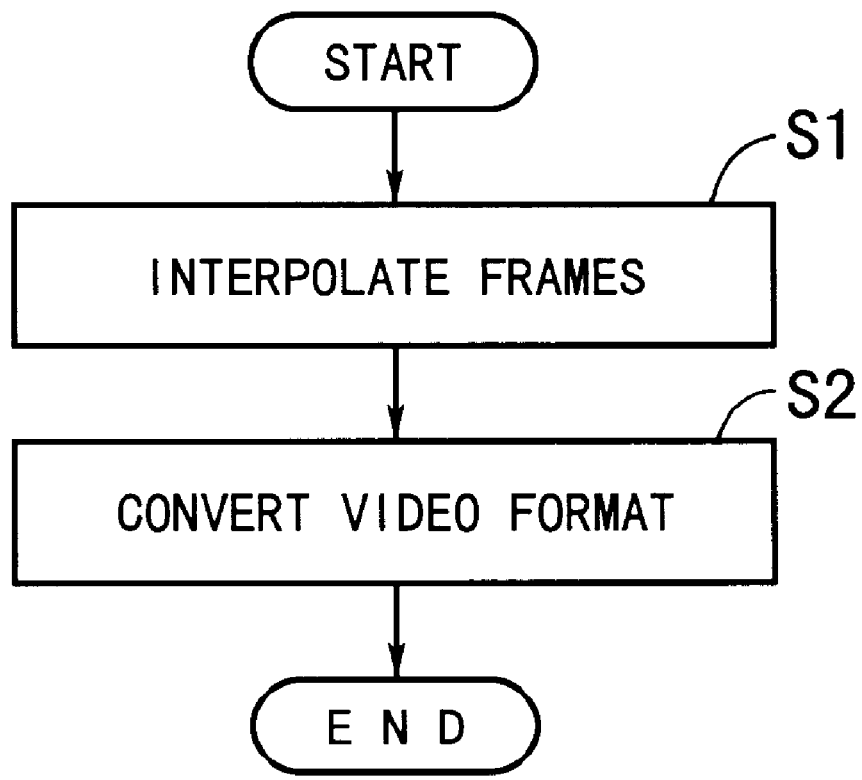

FIGS; 14 and 15 are diagrams showing frame interpolation processes in the second embodiment;

FIG. 16 is a diagram showing the relationships between two video streams in the second embodiment;

FIG. 17 is a flowchart showing a process of video format conversion according to the present invention;

FIG. 18 is a table showing some key specifications of NTSC, PAL, and SECAM;

FIG. 19 is a table showing some key specifications of CIF and QCIF; and

Figure 20:
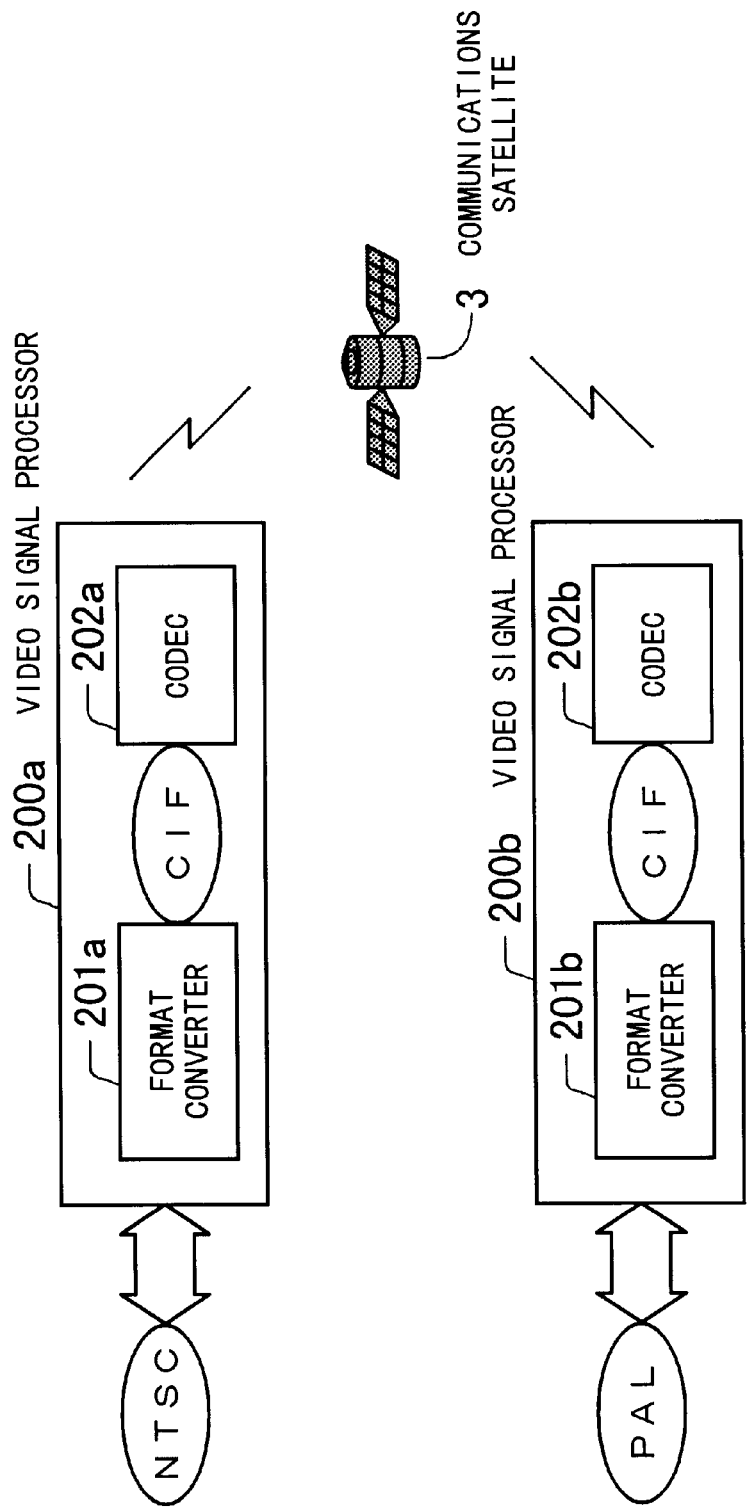

FIG. 20 is a diagram showing a simplified system structure for international digital video communications between two countries using different television system standards.

DESCRIPTION OF THE PREFERRED EMBODIMENTS

Preferred embodiments of the present invention will be described below with reference to the accompanying drawings.

Figure 1:
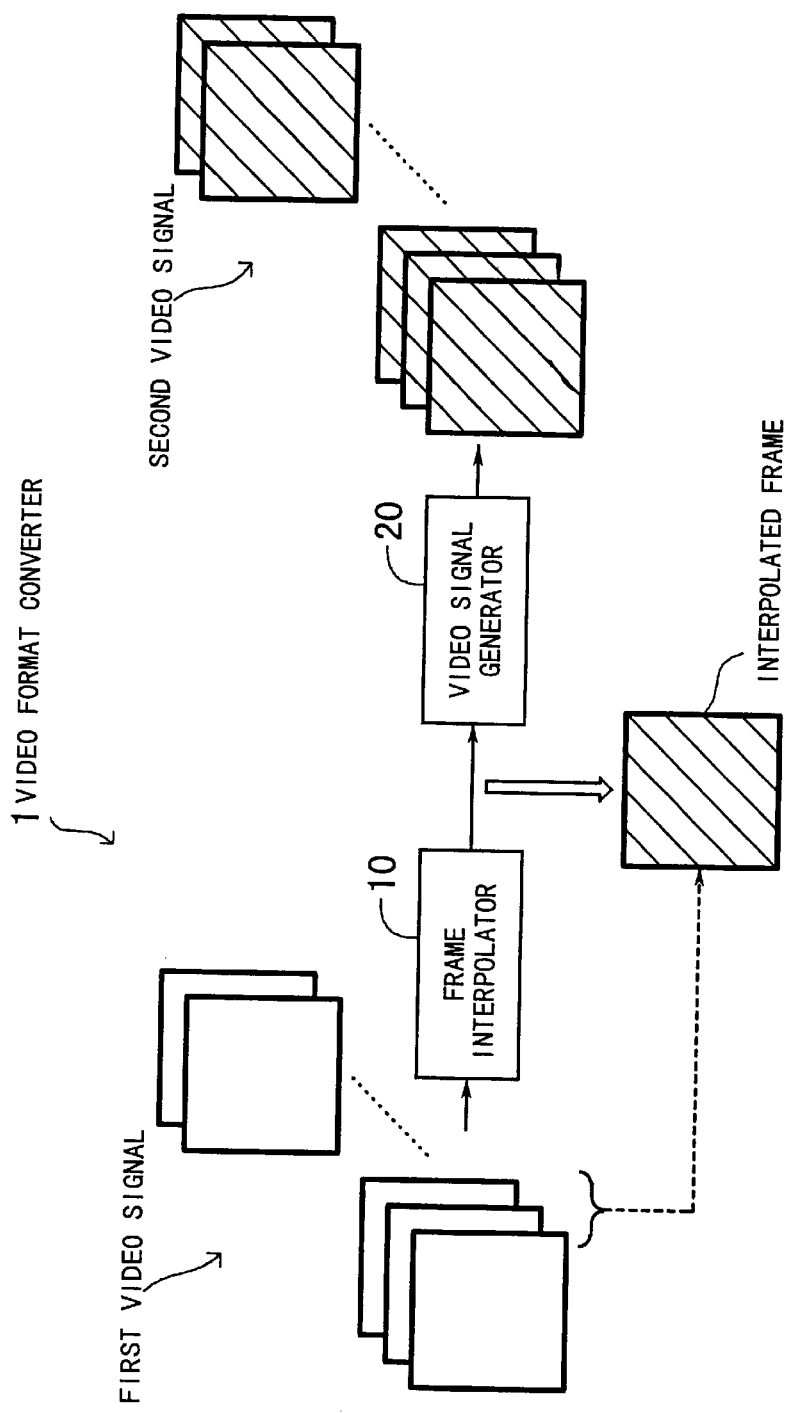
FIG. 1 is a conceptual view of a video format converter according to the present invention.

FIG. 1 shows the concept of a video format converter according to the present invention. This proposed video format converter 1, comprising a frame interpolator 10 and a video signal generator 20, performs video format conversion to send visual information to a remote end that uses a different television system. Here, the term "video format conversion" refers to a process to convert frame frequencies.

According to the present invention, the frame interpolator 10 produces interpolated frames from a first video signal given in a first video format, by using motion vectors obtained therefrom. (Technical details of frame interpolation will be described later.) From the interpolated frames, the video signal generator 20 produces a second video signal in a second video format that is different from the first video format.

Recall that conventional video format converters use simple frame subsampling or frame insertion techniques to convert from one frame frequency to the other. In contrast to this, the proposed video format converter 1 uses frame interpolation techniques to obtain a new frame frequency. That is, the video format converter 1 is designed to generate interpolated frames from the first video signal, and with these interpolated frames, produce the second video signal having a different frame frequency. It should be noted here that the proposed converter 1 produces interpolated frames in an adaptive manner, taking into consideration the difference between consecutive frames, which is represented by motion vectors. Because of the use of interpolated frames to recreate frames of the second video signal, the video format converter 1 of the present invention provides smooth motion in a scene, without awkward frame drops or other unnatural effects.

Figure 2:
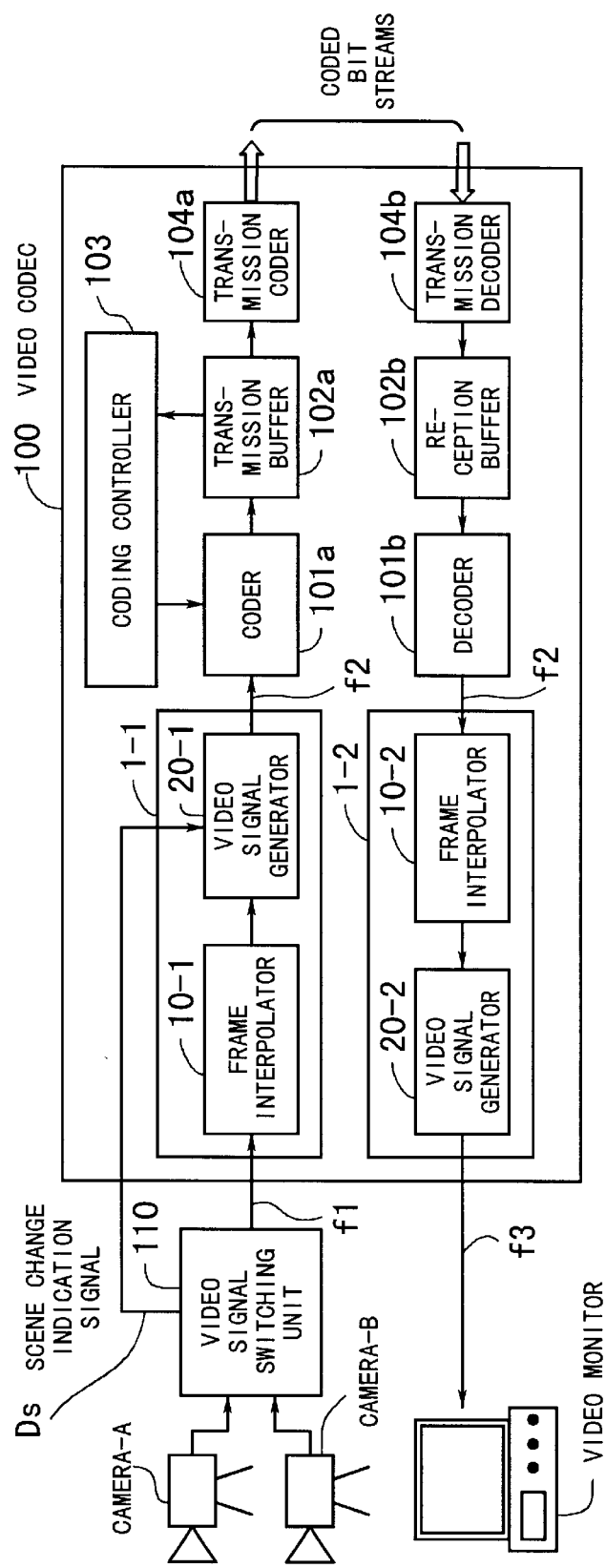
FIG. 2 is a block diagram of a video codec.

A more specific implementation of the above-described video format converter 1 will be described below. FIG. 2 shows a structure of a video codec 100 which processes video signals by using internationally standardized video processing algorithms. This video codec 100 accepts video signals from two cameras, camera-A and camera-B, both having a frame frequency f1, while its internal common video format has another frame frequency f2. An external video monitor requires incoming video signals to have still another frame frequency f3.

A video signal switching unit 110 is interposed between the cameras and video signal switching unit 110 to select either of the two video signals supplied from the camera-A and camera-B. The selected video signal having the first frame frequency f1 is applied to the video codec 100. Switching from camera-A to camera-B, or vice versa, will cause an instant and entire transition of screen images, which is referred to as a "scene change." The video signal switching unit 110 produces a scene change indication signal Ds to inform the video codec 100 of the occurrence of such a scene change.

As the name implies, the video codec 100 provides two major functions, video coding and decoding, employing two dedicated internal data paths for them. Referring to its functional blocks shown in FIG. 2, one data path running from left to right serves as a video coder, while the other data path running from right to left serves as a video decoder. The following section will explain the elements of each data path, as well as their operation.

The video coding path begins with a video format converter 1-1, which comprises a frame interpolator 10-1 and a video signal generator 20-1. The frame interpolator 10-1 produces interpolated frames from a source video signal supplied from the video signal switching unit 110, by using motion vectors obtained from consecutive frames of the source video signal. With the interpolated frames produced, a video signal generator 20-1 produces another video signal stream having a frame frequency f2. When a scene change occurs, the video signal generator 20-1 receives the scene change indication signal Ds from the video signal switching unit 110, and based on this signal, it selects appropriate interpolated frames that are derived from correlated source frames, to continuously produce the converted video signal.

The video signal produced by the video format converter 1-1 is then supplied to a coder 101a to perform a data compression, or reduce its data size. More specifically, the coder 101a performs digital cosine transform (DCT) coding, quantization, and motion compensation, to compress spatial and temporal redundancies of video frames. After that, it applies variable-length coding to produce outgoing data coded in a prescribed format. The actual amount of the produced data may vary frame by frame, and hence the data rate. A transmission buffer 102a serves as temporary storage to smooth out such variations of the data rate. The buffer occupancy ratio is fed back to a coding controller 103, which controls the amount of coded data being produced by the coder 110a, thus regulating the data flow to the transmission buffer 102a. At the final stage of the video coding path, a transmission coder 104a provides several functions necessary for data transmission. For instance, it inserts dummy bits when the transmission buffer 102a is empty, and it adds error correction code to the coded bit stream to be transmitted.

The video decoding path, on the other hand, begins with a transmission decoder 104b which receives a coded bit stream from a remote end. It removes dummy bits from the received bit stream, as well as performs error check and correction. A reception buffer 102b regulates the flow of incoming data to ensure that each frame be decoded within a prescribed period. The received bit stream is then supplied to a decoder 101b, where a variable-length decoding algorithm is applied so as to extract each piece of coded data from the bit stream. The decoder 101b further executes dequantization, inverse-DCT, and motion-compensated image reconstruction, thereby expanding the coded data.

The video signal reconstructed by the decoder 101b has a frame frequency f2, which is not compatible with the external video monitor. For frequency conversion, the video signal is supplied to a video format converter 1-2, which comprises a frame interpolator 10-2 and a video signal generator 20-2. The frame interpolator 10-2 produces interpolated frames from the supplied video signal by using motion vectors. From these interpolated frames, the video signal generator 20-2 produces a new sequence of frames, or a video signal with a different frame frequency, f3, which is compatible with the video monitor.

The format of incoming coded bit stream may change from CIF to QCIF, or QCIF to CIF, during operation. When such a common format switchover is encountered, the video signal generator 20-2 selects appropriate interpolated frames that are derived from correlated source frames, to continue to produce the video signal with the frame frequency f3.

A first embodiment of the present invention will now be described below with reference to FIGS. 3 to 9. In this first embodiment, a video format converter reduces the frame frequency. For illustrative purposes, it is assumed here that the proposed converter is designed to make a frame frequency conversion from 30 Hz to 25 Hz.

Figure 3:
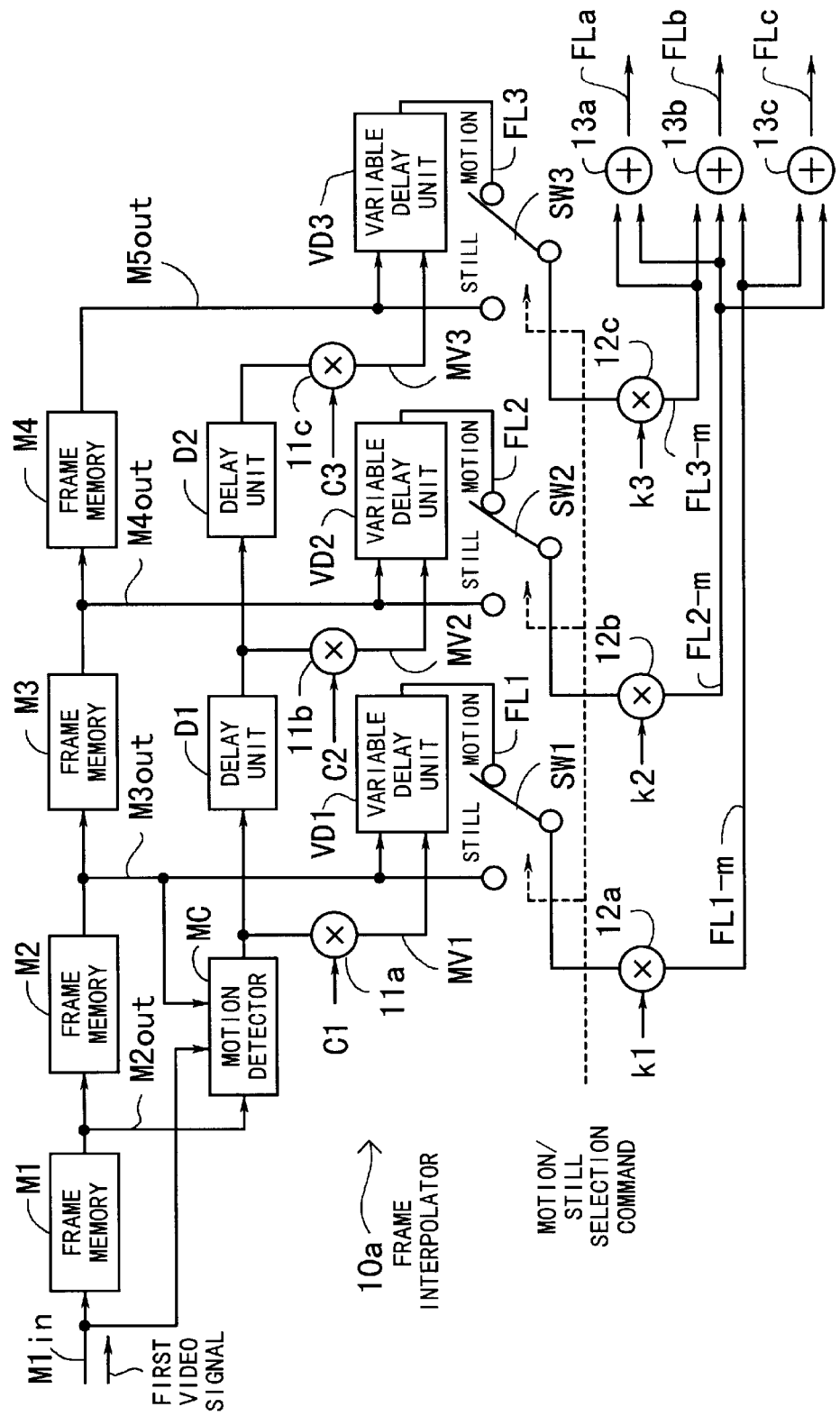
FIG. 3 is a block diagram of a frame interpolator according to a first embodiment of the present invention.

Referring to a block diagram of FIG. 3, a frame interpolator 10a designed for video format conversion to a lower frame frequency is provided. This frame interpolator 10a produces three kinds of interpolated frames FLa, FLb, and FLc from a first video signal. It employs four frame memories M1 to M4, which are connected in series to store four past frames of the first video signal being supplied from an external source. As FIG. 3 shows, the symbol for the present incoming frame is "M1in," while those for the outputs of the frame memories M1, M2, M3, and M4 are "M2out," "M3out," "M4out," and "M5out," respectively.

Figure 4:
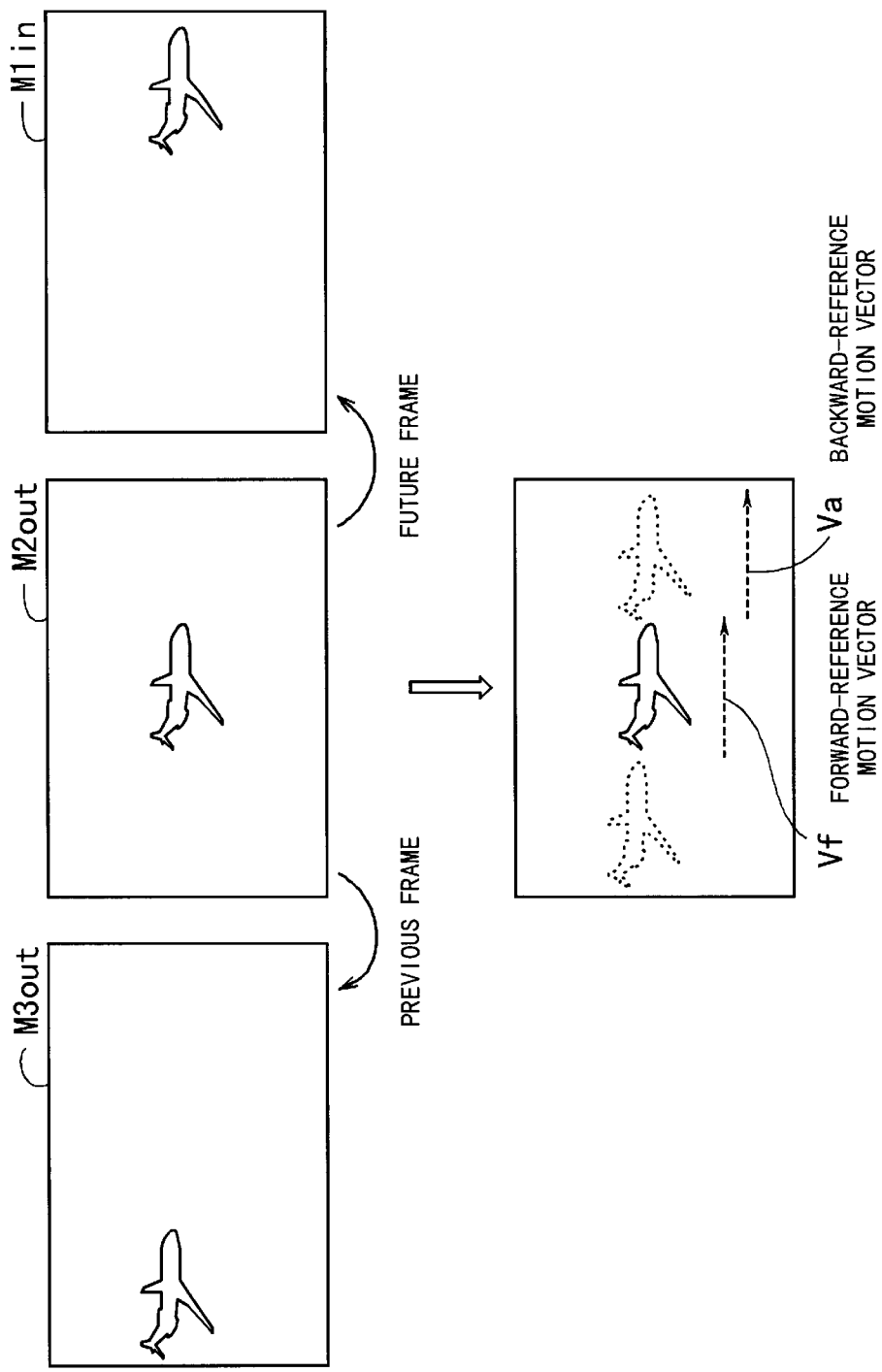
FIG. 4 is a diagram showing the concept of forward-reference and backward-reference motion vectors.

A motion detector MC produces forward-reference motion vectors by making a comparison between the frames M2out and M3out. It also produces backward-reference motion vectors by making a comparison between the frames M1in and M2out. FIG. 4 explains the concept of forward-reference and backward-reference motion vectors. Suppose here that the frame M2out is now being subjected to the motion detection process (i.e., M2out is the current picture). When observed from this frame M2out, the frame M3out is regarded as its previous frame, and the frame M1in as its future frame. A forward-reference motion vector Vf represents the direction and distance of a moving object observed between the frames M3out and M2out. On the other hand, a backward-reference motion vector Va represents those observed between the frames M2out and M1in.

Referring again to FIG. 3, the frame interpolator 10a has two delay units D1 and D2 each of which provides a one-frame delay to given forward-reference and backward-reference motion vectors Vf and Va. That is, forward-reference and backward-reference motion vectors Vf and Va appearing at the output of the delay unit D1 have a delay of one frame interval, with respect to those at the output of the motion detector MC, while those appearing at the output of the delay unit D2 have a delay of two frame intervals.

The above-noted motion vector outputs of the motion detector MC and delay units D1 and D2 are supplied respectively to three multipliers 11a, 11b, and 11c for multiplication of vector weighting coefficients C1, C2, and C3. Here, the vector weighting coefficients C1 to C3 denote the mixture ratios of forward-reference motion vectors and backward-reference motion vectors. By multiplying such coefficients, each multiplier 11a to 11c calculates a weighted mixture of forward-reference motion vectors Vf and backward-reference motion vectors Va thereby outputting weighted motion vectors MV1 to MV3. According to those weighted motion vectors MV1 to MV3, variable delay units VD1 to VD3 apply motion compensation to the frames M3out to M5out, respectively. They output the resultant frames FL1 to FL3 in phase with the three frames M3out to M5out, respectively.

Switches SW1 to SW3 select video frames according to a motion/still selection command provided from an external source. More specifically, they select the outputs of the variable delay units VD1 to VD3 when the motion/still selection command indicates motion picture mode. In turn, they select the outputs of the frame memories M2 to M4 when the command indicates still picture mode. Picture elements of the selected frames are then supplied to multipliers 12a to 12c for multiplication of frame weighting coefficients k1 to k3. Here, the coefficients k1 to k3 give a mixture ratio of the three selected frames. The resultant weighted frame signals FL1-m to FL3-m are supplied to adders at the next stage for frame summation.

There are three adders 13a to 13c to obtain three interpolated frames. The first adder 13a produces an interpolated frame FLa by adding the last two weighted frames FL2-m and FL3-m. The second adder 13b produces another interpolated frame FLb by adding all the three weighted frames FL1-m, FL2-m and FL3-m. The third adder 13c produces still another interpolated frame FLc by adding the first two weighted frames FL1-m and FL2-m.

Figure 5:
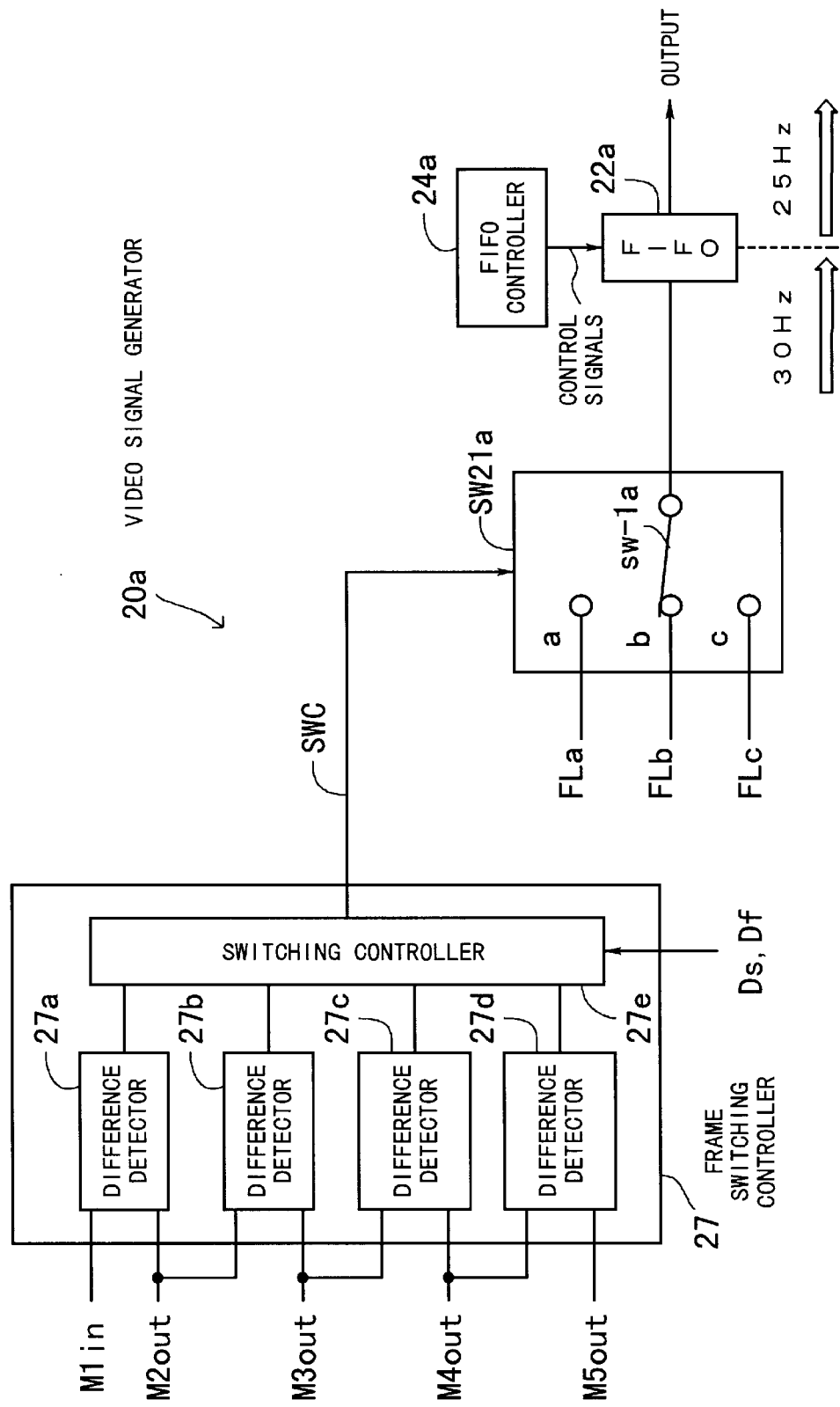
FIG. 5 is a block diagram of a video signal generator of the first embodiment.

The next section will now explain a specific structure of a video signal generator designed for video format conversion to a lower frame frequency (e.g., 30 Hz to 25 Hz). FIG. 5 is a block diagram of a video signal generator 20a. This video signal generator 20a comprises a switch SW21a, a FIFO 22a, a FIFO controller 24a, and a frame switching controller 27.

The frame switching controller 27 comprises difference detectors 27a to 27d and a switching controller 27e. The difference detector 27a detects differences between the frames M1in and M2out. The difference detector 27b detects differences between the frames M2out and M3out. The difference detector 27c detects differences between the frames M3out and M4out. The difference detector 27d detects differences between the frames M4out and M5out. Examining the detected differences, the switching controller 27e finds the maximum difference value. This information permits the switching controller 27e to determine at which frame position the scene change or common format switchover has occurred, based on a scene change indication signal Ds or a common format switching command Df supplied from external sources. The switching controller 27e thus outputs an appropriate switching control command SWC to the switch SW21a.

The switch SW21a has three input terminals "a," "b," and "c" to receive interpolated frames FLa to FLc, the outputs of the adders 13a to 13c described in FIG. 3. The switch SW21a selects either one of the three inputs according to the switching control command SWC as will be described later.

The FIFO 22a serves as a buffer memory for the interpolated frames being supplied from the switch SW21a at the rate of 30 Hz. It controls their output timings under the control of the FIFO controller 24a, so that interpolated frames will be sent out at 25 Hz.

The switch SW21a is controlled as follows. The switch SW21a has two modes of operation: normal mode and transitional mode. In normal mode, the switch SW21a keeps its contact sw-1a at the second position "b," and thus the FIFO 22a receives interpolated frames FLb at a rate of 30 Hz. The FIFO 22a decimates some of the received frames at predetermined intervals, thereby converting the frame frequency down to 25 Hz.

Transitional mode, as opposed to the normal mode, is selected at scene changes, as well as in the case that the common video format is switched from CIF to QCIF or vise versa (i.e., common format switchover). While later explanation assumes the occurrence of a scene change, those skilled in the art will appreciate that the same will apply to the operation in the case of common format switchover.

Figure 6:
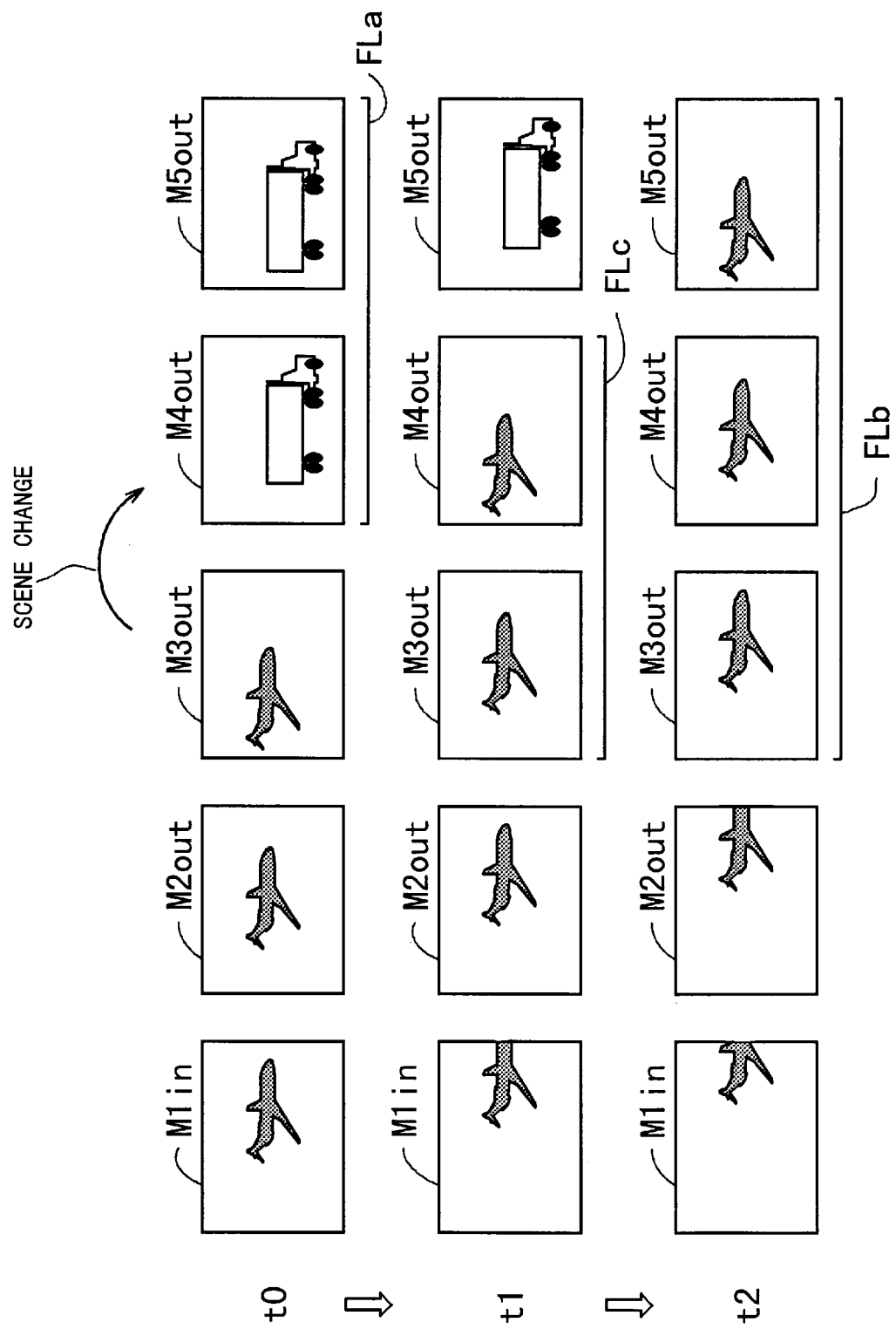
FIG. 6 is a diagram which shows inputs and outputs of frame memories.

FIG. 6 shows inputs and outputs of the frame memories M1 to M4 (FIG. 3). The symbol "M1in" is used to represent a source frame being entered to the first frame memory M1, while "M2out" to "M5out" represent the output pictures of the frame memories M1 to M4, respectively. Those five consecutive pictures represent a part of a given frame sequence. FIG. 6 shows three instances of such frame snapshots taken at times t0, t1, and t2, and in this progression, the pictures are shifted by one frame toward the right-hand side of FIG. 6.

This example video sequence of FIG. 6 includes a scene change, which actually happened at some time before t0. The switching controller 27e is designed to initiate transitional mode operation when such a scene change is observed between the frames M3out and M4out. Here, the switching control command SWC serves as a message to inform the switch SW21a that a scene change has reached that critical point. This message makes the switch SW21a enter the transitional mode and handle the scene change at times t0 and t1. That is, the transitional mode operation lasts only two frame intervals, and the switch SW21a returns to normal mode at time t2 to resume normal switching operations.

At time t0 (i.e., the first half of transitional mode operation), the switch SW21a first has to confine the source of interpolated frames to frames captured before the occurrence of the scene change. To this end, the switch SW21a moves its contact sw-1a to the first position "a" according to the switching control command SWC, thereby selecting an interpolated frame FLa derived from the frames M4out and M5out (i.e., old scene). After that, at time t1, the switch SW21a moves the contact sw-1a to the third position "c" so as to select interpolated frames derived only from a new scene. Accordingly, an interpolated frame FLc produced from the frames M3out and M4out is selected. At time t2, the switch SW21a resumes its normal mode operation by returning its contact sw-1a to the second position "b," again selecting interpolated frames FLb being produced from M3out, M4out, and M5out.

The switch SW21a is designed to change the position of its contact sw-1a step by step (i.e., "b"–"c"–"a"–"b") according to each switching control command SWC. However, it is not intended that the invention be limited to this structure, but the switch SW21a can also be configured to do the same autonomously at predetermined intervals, once it receives the first switching control command SWC.

The next section will now describe a process of producing interpolated frames for video format conversion to a lower frame frequency (e.g., 30 Hz to 25 Hz).

Figure 7:
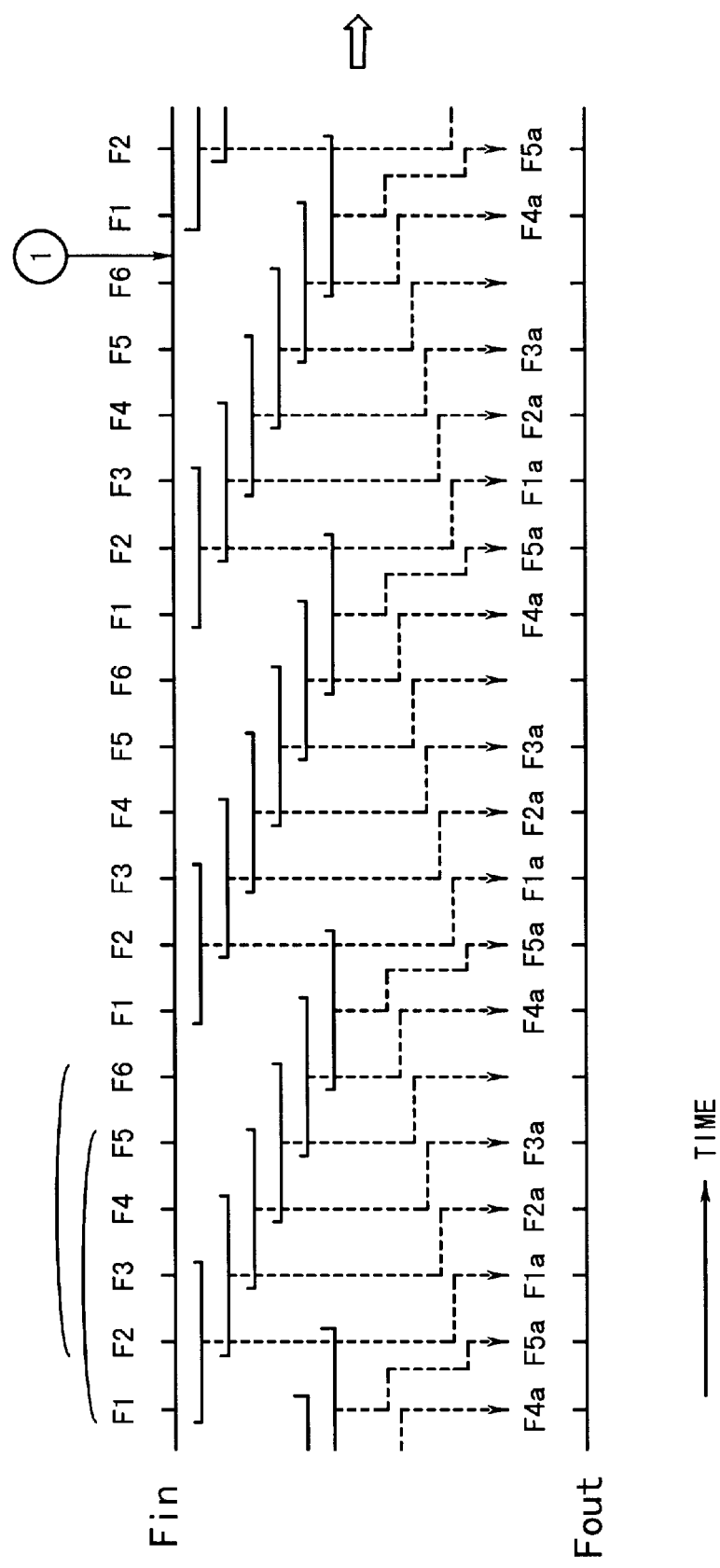
FIGS. 7 and 8 are diagrams showing frame interpolation processes in the first embodiment.
Figure 8:
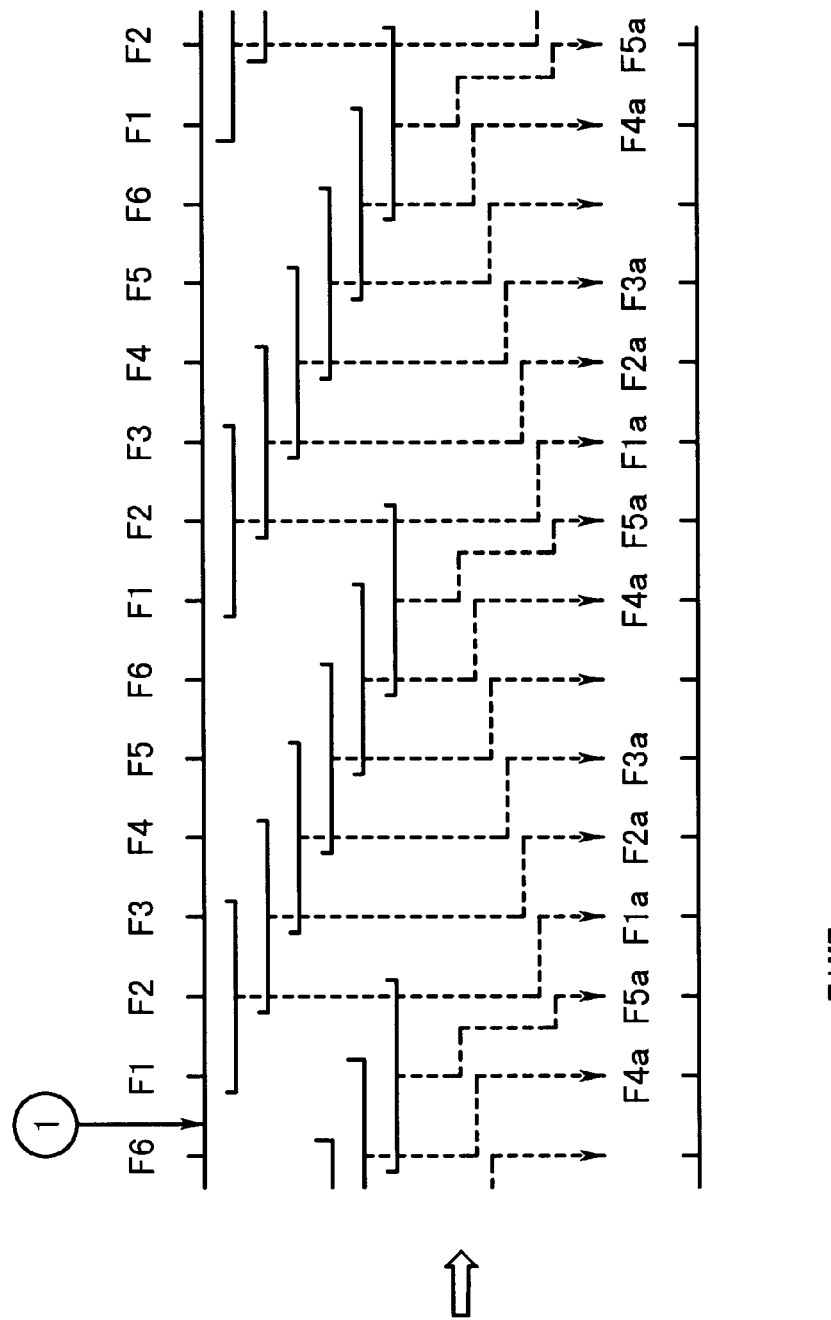

FIGS. 7 and 8 present a frame interpolation process including no scene change or common format switchover. The symbol "Fin" represents a source frame sequence having a frame frequency of 30 Hz that is given to the frame interpolator 10a. For the sake of convenience, source frames are labeled "F1" to "F6" in a cyclic manner. Consider that the first instance of "F1" appears at the output of the fourth frame memory M4. Then the frames F2, F3, and F4 are at the outputs of the frame memories M3, M2, and M1, respectively, and F5 at the input of the first frame memory M1. At the next cycle, the frame F2 appears at the output of the frame memory M4, since the frame memory contents are shifted forward by one frame. Likewise, the frames F3, F4, and F5 are now at the outputs of the frame memories M3, M2, and M1, respectively, and F6 at the input of the first frame memory M1.

On the other hand, the symbol "Fout" shows a series of interpolated frames FLb produced by the video signal generator 20a when the switch SW21a is in normal mode (i.e., its contact is at the second position "b"). The interpolated frames Fout are labeled "F1a" to "F5a" in a cyclic manner In the process shown in FIGS. 7 and 8, interpolated frames are produced from the following combinations of source frames:

F1a produced from F1, F2, and F3

F2a produced from F2, F3, and F4

F3a produced from F3, F4, and F5

F4a produced from F5, F6, and F1

F5a produced from F6, F1, and F2

Note here that, although the frame interpolator 10a produces interpolated frames from frames F4 to F6, the FIFO 22a in the video signal generator 20a will never output them. That is, the proposed video format converter subsamples the produced interpolated frames to reduce its frame frequency.

Figure 9:
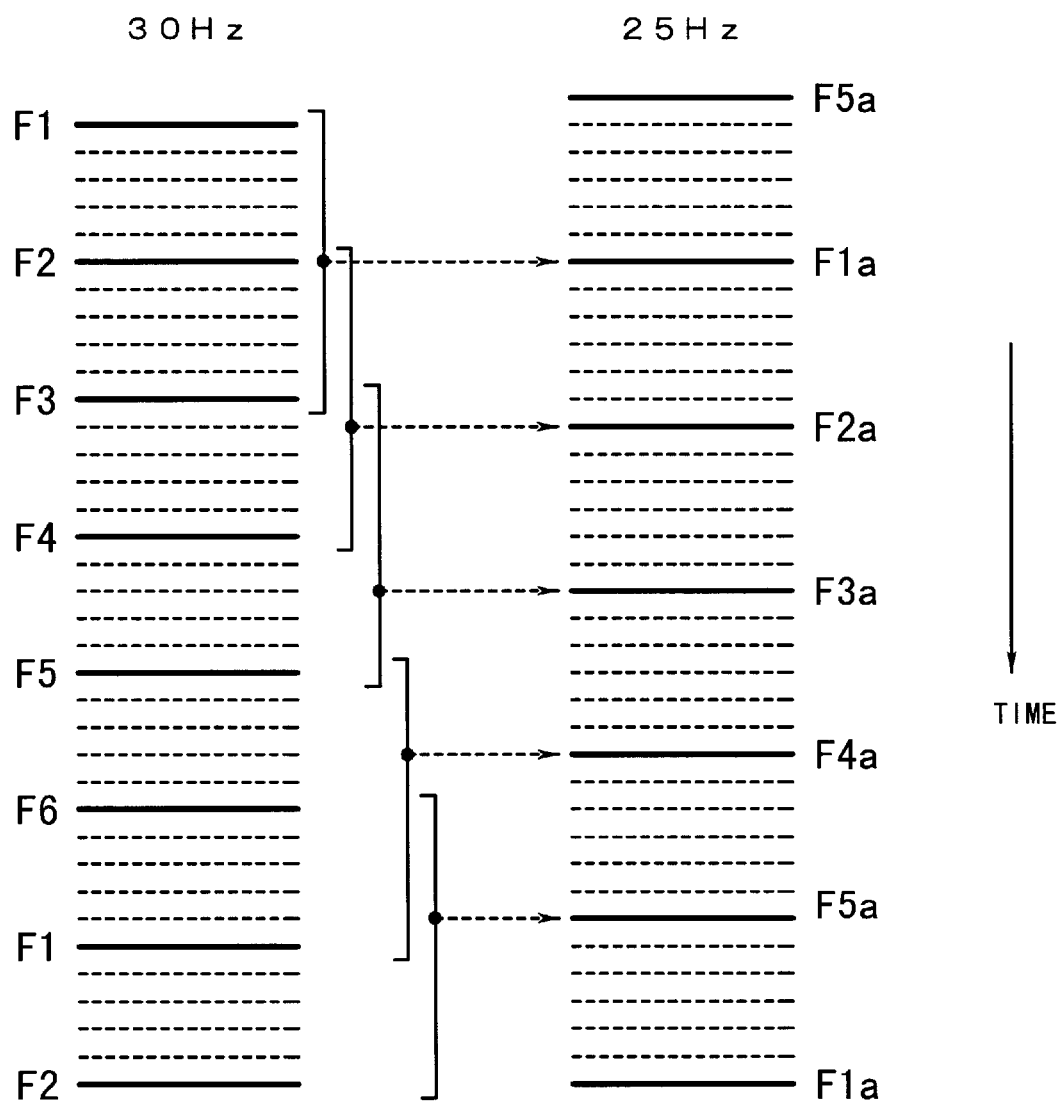
FIG. 9 is a diagram showing the relationships between two video streams in the first embodiment.

FIG. 9 depicts the above-noted relationships between source frames (30 Hz) and subsampled frames (25 Hz). Each bold solid line represents a frame, while broken lines indicate unit time intervals. The interpolated frames Fout shown in FIGS. 7 and 8 are fed to the FIFO 22a at the rate of 30 Hz. The FIFO 22a regulates the intervals of output frames so that they will be sent out at 25 Hz.

A second embodiment of the present invention will now be described below, with reference to FIGS. 10 to 17. As opposed to the first embodiment, a video format converter proposed of the second embodiment is designed to raise the frame frequency. For illustrative purposes, it is assumed here that the proposed converter makes a frame frequency conversion from 25 Hz to 30 Hz.

Referring first to a block diagram of FIG. 10, a frame interpolator 10b designed to raise the frame frequency will be described below. This frame interpolator 10b produces four kinds of interpolated frames FLa, FLb, FLc, and FLd from a first video signal. This frame interpolator 10b differs from the frame interpolator 10a of FIG. 3 in that a switch SW4 and an adder 13d are newly employed. Since the other functional elements of the frame interpolator 10b are common to those of the frame interpolator 10a, the following explanation will focus on their differences, while maintaining like reference numerals to like elements.

The adder 13d produces a fourth interpolated frame FLd by adding the weighted frames FL1-m and FL2-m. The switch SW4 is controlled through a switching control command SWCa. While being normally closed, this switch SW4 is turned off when a scene change or common format switchover is detected, in which case the interpolated frame FLd is identical to the frame FL1-m, since the adder 13d becomes transparent. More details of the switch SW4 and switching control command SWCa will be provided later.

Figure 11:
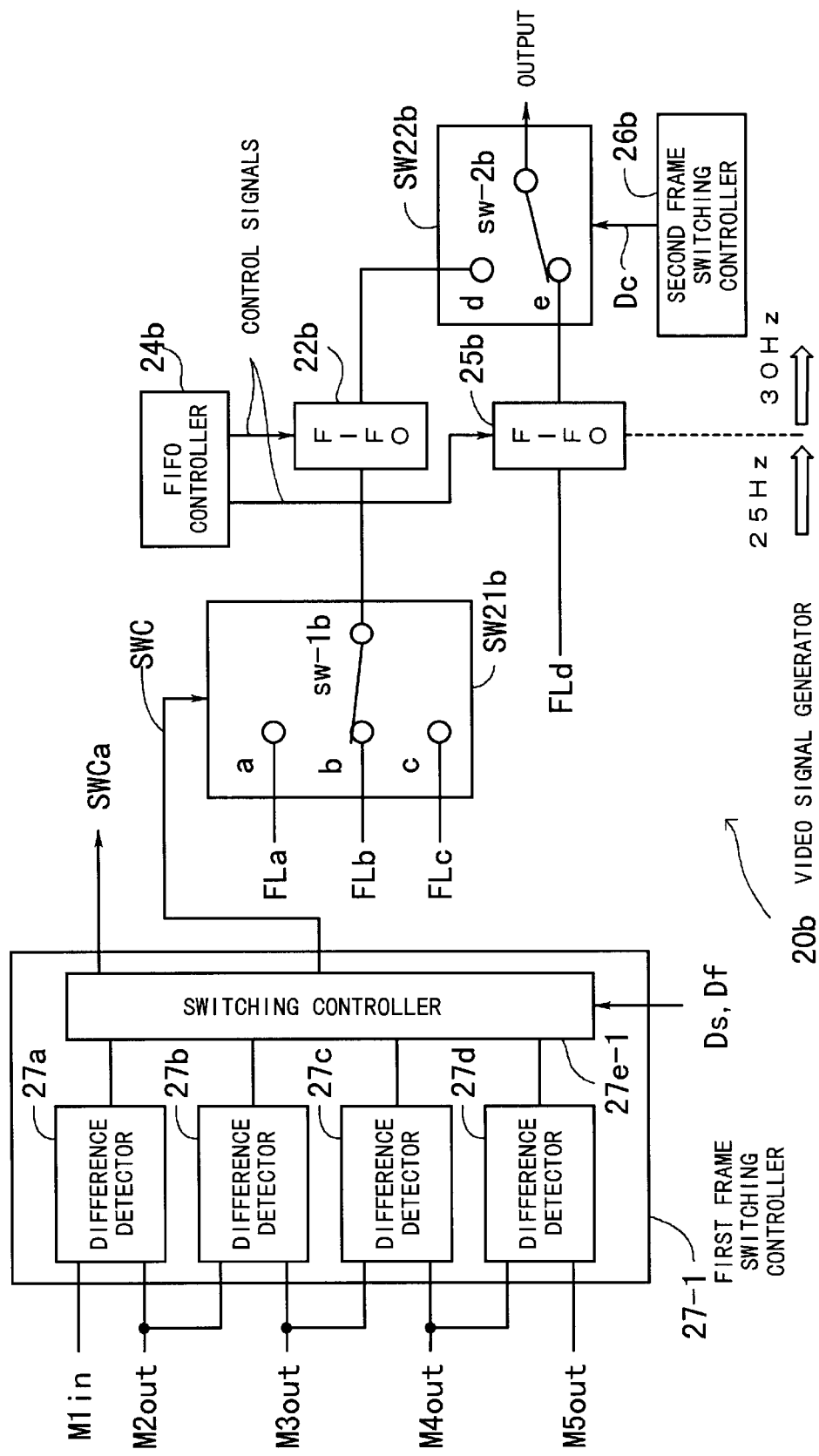
FIG. 11 is a block diagram of a video signal generator of the second embodiment.

Referring next to FIG. 11, a video signal generator 20b designed to raise the frame frequency will be described below. This video signal generator 20b comprises two switches SW21b and SW22b, two FIFOs 22b and 25b, a FIFO controller 24b, a first frame switching controller 27-1, and a second frame switching controller 26b.

The first frame switching controller 27-1 has difference detectors 27a to 27d and a switching controller 27e-1. The difference detector 27a detects differences between the frames M1in and M2out. The difference detector 27b detects differences between the frames M2out and M3out. The difference detector 27c detects differences between the frames M3out and M4out. The difference detector 27d detects differences between the frames M4out and M5out. By examining the detected differences, the switching controller 27e-1 finds the maximum difference value. This information permits the switching controller 27e-1 to determine at which frame position the scene change or common format switchover has occurred, based on a scene change indication signal Ds or a common format switching command Df supplied from external sources. The switching controller 27e-1 thus outputs an appropriate switching control command SWC to control the first switch SW21b. It further produces another switching control command SWCa to control the switch SW4 in the frame interpolator 10b.

Figure 10:
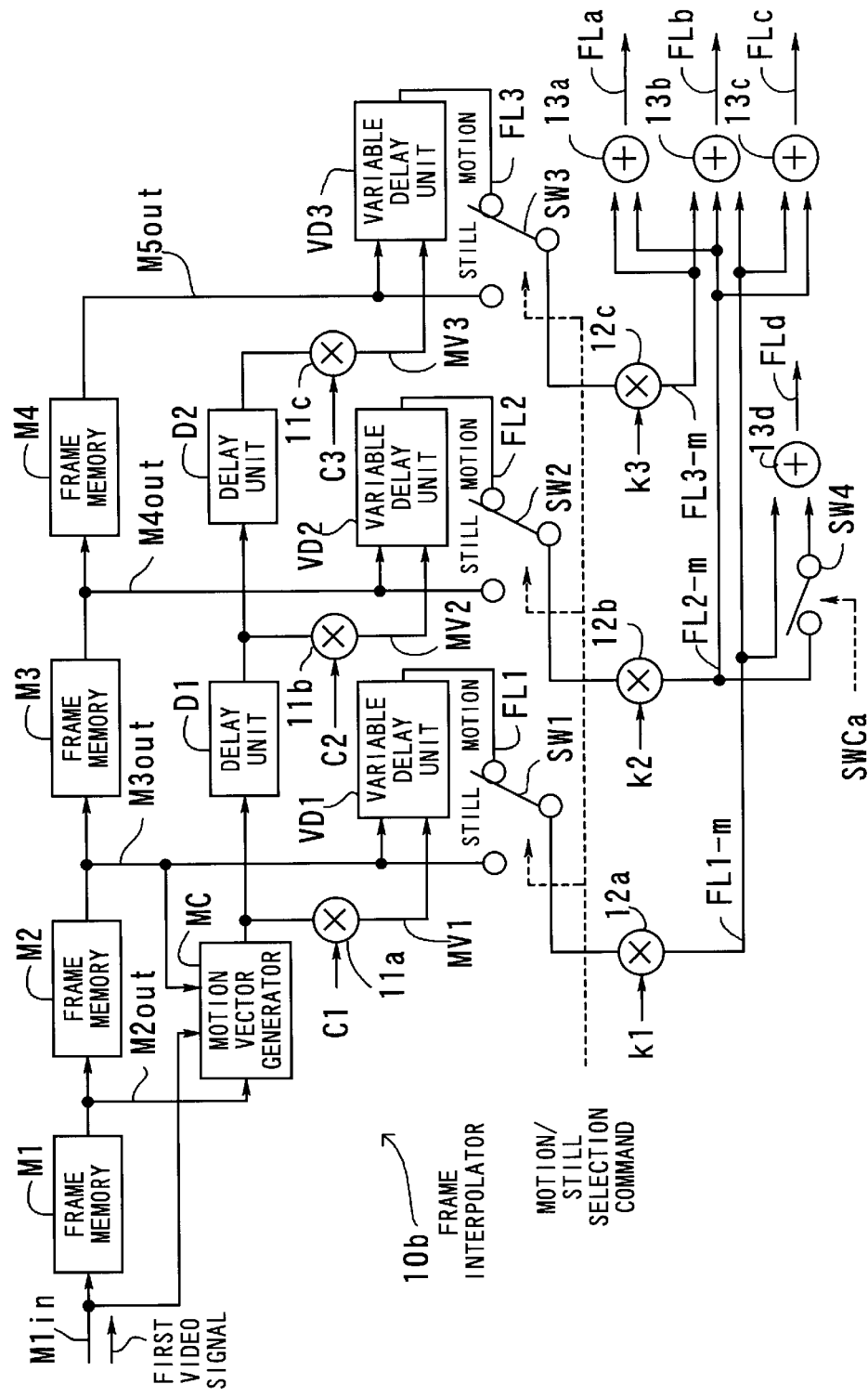
FIG. 10 is a block diagram of a frame interpolator according to a second embodiment of the present invention.

The first switch SW21b has three input terminals "a," "b," and "c" to receive three kinds of interpolated frames FLa, FLb, and FLc, the outputs of the adders 13a to 13c shown in FIG. 10. This first switch SW21b selects either one of the three inputs according to the switching control command SWC, and sends the selected frames to the first FIFO 22b. On the other hand, the second FIFO 25b receives another kind of interpolated frames, FLd, from the frame interpolator 10b. Note that those interpolated frames are generated at 30 Hz, i.e., the rate of source video frames. The FIFO controller 24b supplies control signals to the two FIFOs 22b and 25b to regulate the flow of outgoing frames, so that they will be output at 25 Hz.

The outputs of the two FIFOs 22b and 25b are then supplied to two input terminals "d" and "e" of the second switch SW22b, respectively. According to frame switching commands Dc from the controller 26b, the second switch SW21b chooses one of the two input signals as final output of the video signal generator 20b.

Figure 12:
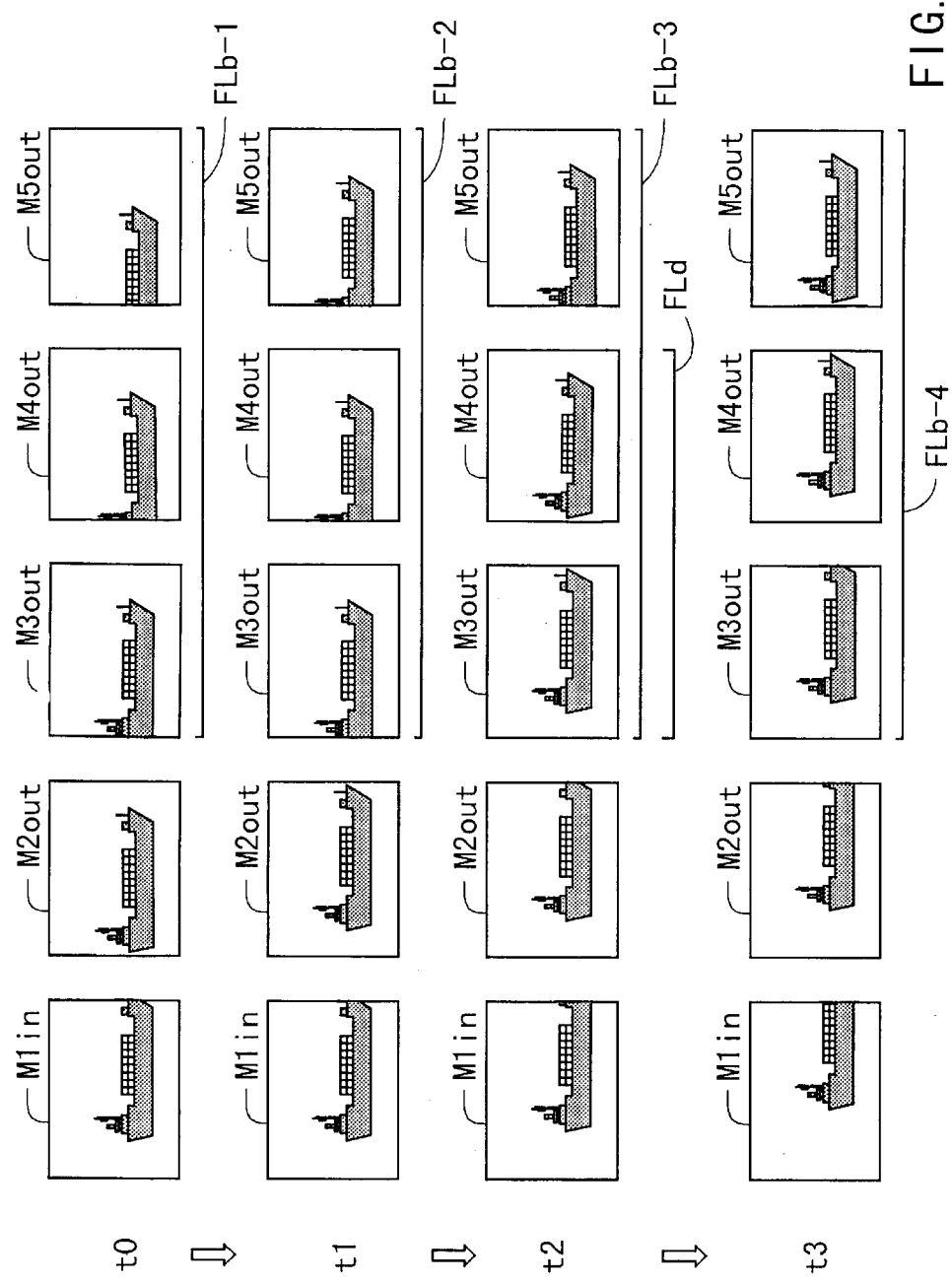
FIG. 12 is a diagram which shows inputs and outputs of frame memories.

Referring to FIGS. 10 to 12, the following section will describe how the switches SW4, SW21b, and SW22b operate in the second embodiment. As in the first embodiment, those switches have two modes of operation: normal mode and transitional mode. The latter mode is selected in the case of scene changes or common format switchover. Although the case of a scene change will be discussed later, those skilled in the art will appreciate that the same will apply to common format switchover.

FIG. 12 shows inputs and outputs of the frame memories M1 to M4 (FIG. 10). The symbol M1in is used to represent a source frame being entered to the first frame memory M1, while M2out to M5out represent the output pictures of the frame memories M1 to M4, respectively. These five consecutive pictures represent a part of a given frame sequence. FIG. 12 shows four instances of such frame snapshots taken at times t0, t1, t2, and t3, and in this progression, the pictures are shifted by one frame, toward the right-hand side of FIG. 12.

In normal mode, the SW4 is closed and the first switch SW21b keeps its contact sw-1b at the second position "b." On the other hand, the second switch SW22b connects its contact sw-2b at the first position "d" according to the frame switching command Dc, which allows the produced frames to be transmitted through the First FIFO 22b and second switch SW21b in the following sequence:

FLb-1 produced from frames M3out to M5out at time t0
    FLb-2 produced from frames M3out to M5out at time t1
    FLb-3 produced from frames M3out to M5out at time t2
    FLb-4 produced from frames M3out to M5out at time t3

When the interpolated frame FLb-3 is output, the adder 13d produces another interpolated frame FLd from the frames M3out and M4out and supplies it to the second FIFO 25b. After the interpolated frame FLb-4 is sent out, the frame switching controller 26b alters its command output Dc to make the first FIFO 22b move its contact sw-2b to the position "e" so as to select the frame FLd held in the second FIFO 25b. The frame switching controller 26b then commands the second switch SW21b to return its contact sw-2b to the position "d," thus repeating the above-described operation.

If a scene change is encountered, the proposed video format converter enters to transitional mode. The operation in this mode will be described below with reference to FIGS. 6, 10, and 11.

As described earlier, the example video sequence of FIG. 6 includes a scene change. The switching controller 27e-1 (FIG. 11) is designed to initiate transitional mode operation, when such a scene change is observed between the frames M3out and M4out. Here, the switching control command SWC serves as a message to inform the first switch SW21b that the scene change has reached that critical point. This message makes the first switch SW21b enter the transitional mode and handle the scene change at times t0 and t1. The first switch SW21b then returns to normal mode at time t2 to resume normal switching operations.

At time t0, the first switch SW21b has to confine the source of interpolated frames to frames captured before the occurrence of the scene change. To this end, the first switch SW21b moves its contact sw-1b to the first position "a" according to the switching control command SWC, thereby selecting an interpolated frame FLa produced from the frames M4out and M5out. At the same time, the second switch SW22b sets its contact sw-2b to the first position "d" according to the frame switching command Dc. As a result, the interpolated frame FLa is sent out.

At time t1, the first switch SW21b has to select an interpolated frame produced only from the new scene. The first switch SW21b thus moves its contact sw-1b to the third position "c," thereby selecting an interpolated frame FLc produced from the frames M3out and M4out. The second switch SW22b maintains its contact position "d" according to the frame switching command Dc, thus sending out the selected interpolated frame FLc.

At time t2, the first switch SW21b returns its contact sw-1b to the second position "b" to resume normal mode operation, again selecting interpolated frames FLb. The second switch SW22b keeps its contact position "d" according to the frame switching command Dc, thus sending out the selected interpolated frame FLb.

As discussed above, the first switch SW21b is designed to change the position of its contact sw-1b step by step (i.e., "b"–"c"–"a"–"b") according to each switching control command SWC. However, it is not intended that the invention be limited to this structure, but the first switch SW21b can also be configured to do the same autonomously at predetermined intervals, once it receives the first switching control command SWC.

Figure 13:
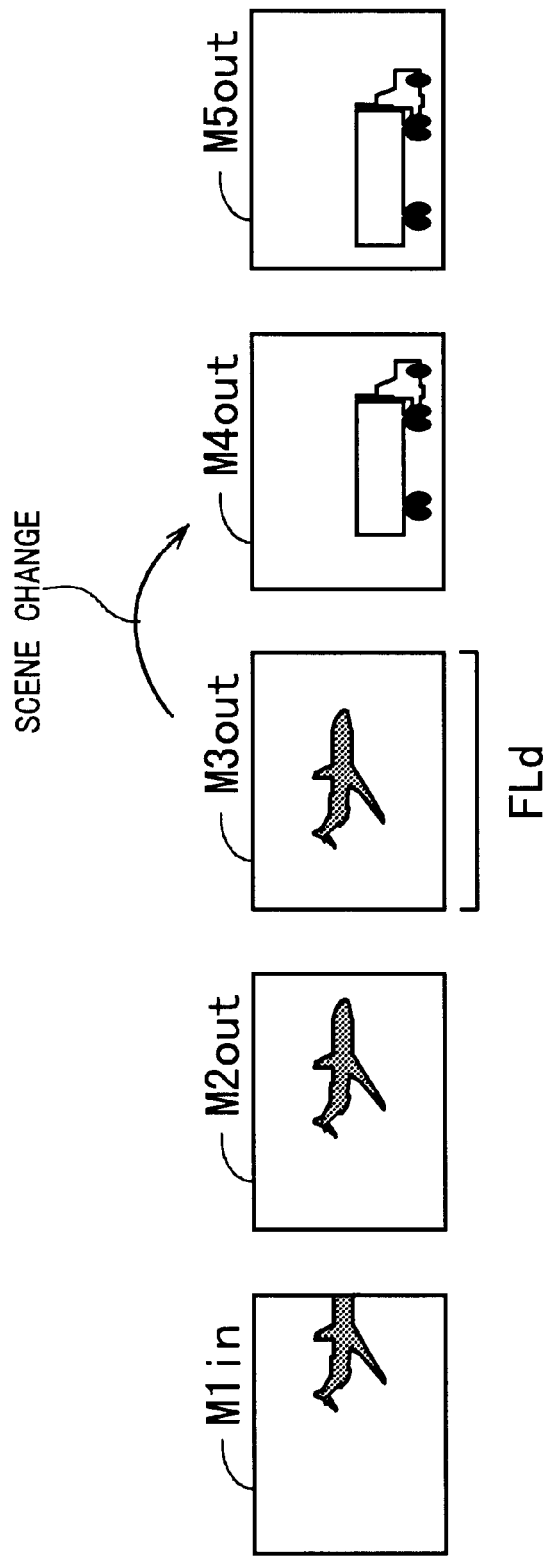
FIG. 13 is a diagram showing such a situation where the proposed converter encounters a scene change when producing interpolated frames in normal mode.

FIG. 13 shows such a situation where the proposed converter encounters a scene change when producing an interpolated frame FLd in normal mode. Although it is normally closed, the switch SW4 is designed to become open when a scene change is observed at a particular point shown in FIG. 13. This means that the aforementioned switching control command SWCa serves as a message to inform the switch SW4 that a scene change has reached that critical point. With the switch SW4 turned off, the adder 13d produces an interpolated frame FLd solely from the frame M3out.

Figure 14:
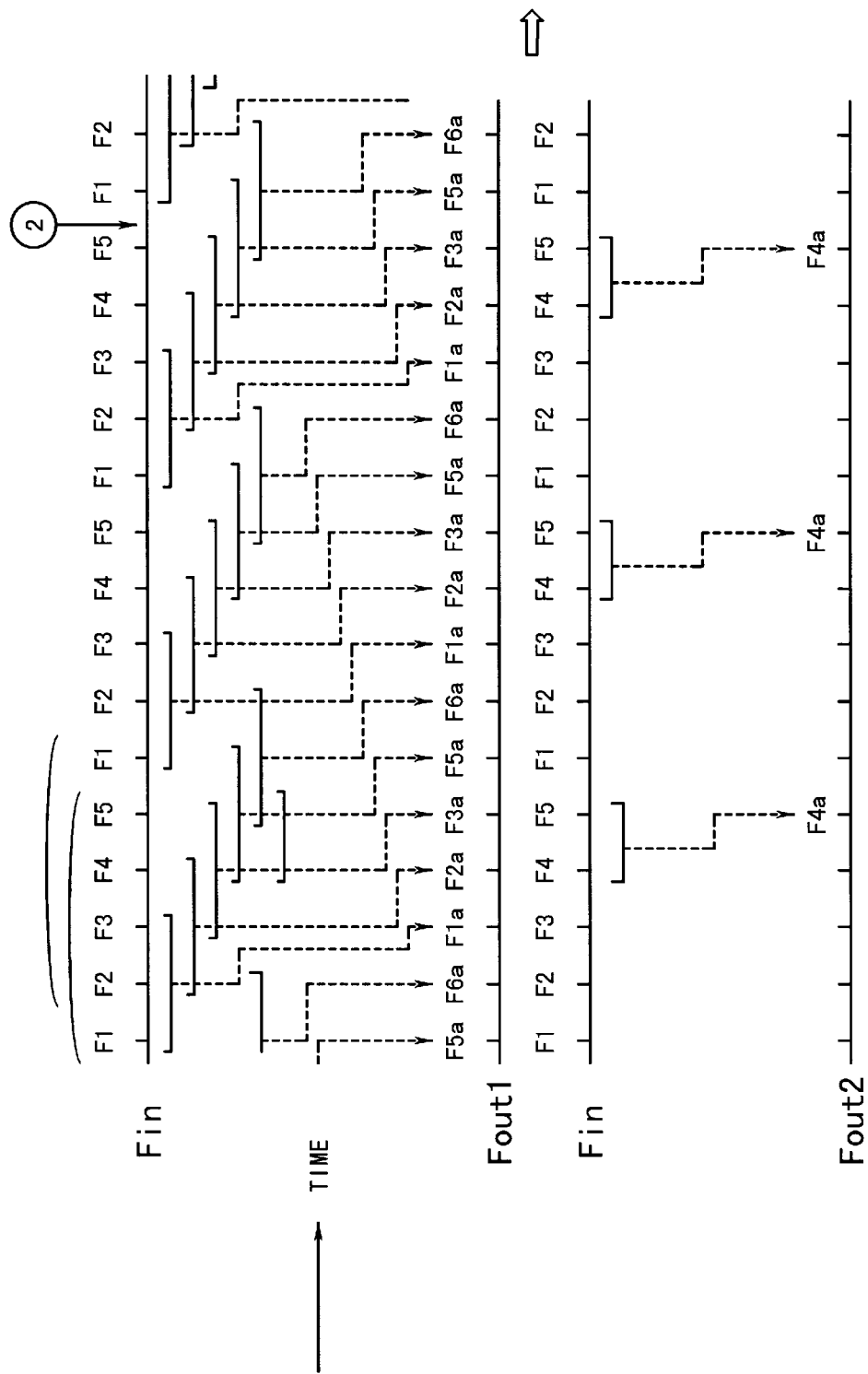
Figure 15:
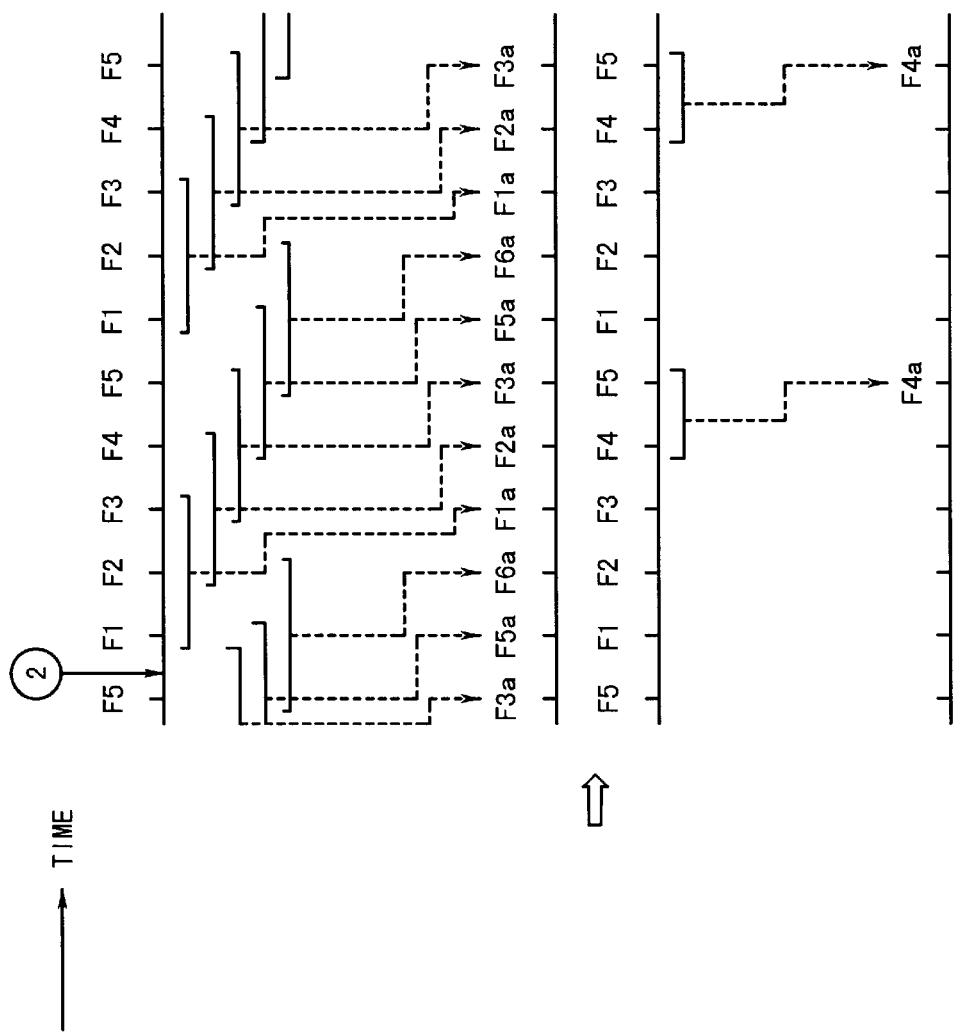

Referring now to FIGS. 14 and 15, the next section will describe a process of producing interpolated frames to convert the video format to a higher frame frequency (e.g., 25 Hz to 30 Hz). This illustrated process, however, includes no scene change or common format switchover.

The symbol "Fin" represents a source frame sequence having a frame frequency of 25 Hz that is given to the frame interpolator 10b. For the sake of convenience, source frames are labeled "F1" to "F5" in a cyclic manner. Consider that the first instance of "F1" appears at the output of the fourth frame memory M4. Then the frames F2, F3, and F4 are at the outputs of the frame memories M3, M2, and M1, respectively, and F5 at the input of the first frame memory M1.

At the next cycle, the frame F2 appears at the output of the frame memory M4, since the frame memory contents are shifted forward by one frame. Likewise, other frames F3, F4, and F5 are now at the outputs of the frame memories M3, M2, and M1, respectively, and the second instance of F1 appears at the input of the first frame memory M1.

On the other hand, the symbol "Fout1" shows a series of interpolated frames FLb produced by the video signal generator 20b when the first switch SW21b is in normal mode (i.e., its contact is at the second position "b"). Those frames Fout1 are labeled "F1a," "F2a," "F3a," "F5a," and "F6a" in a cyclic manner. Further, the symbol "Fout2" shows additional interpolated frames FLd produced by the adder 13d in the frame interpolator 10b. In FIGS. 14 and 15, such interpolated frames are labeled "F4a."

The above process as a whole generates six interpolated frames in the following sequence during five source frame intervals:

F1a produced from F1, F2, and F3
F2a produced from F2, F3, and F4
F3a produced from F3, F4, and F5
F4a produced from F4 and F5
F5a produced from F4, F5, and F1
F6a produced from F5, F1, and F2

Note here that the frames F3a and F4a are produced at the same time. The flow of produced frames is regulated by controlling the FIFOs, thus obtaining final output at a frame frequency of 30 Hz.

FIG. 16 depicts the relationships between source frame sequence (25 Hz) and converted frame sequence (30 Hz). Each bold solid line represents a frame, while broken lines indicate unit time intervals. The interpolated frames Fout1 and Fout2 shown in FIGS. 14 and 15 are fed to the FIFOs 22b and 25b for output flow control. The FIFOs 22b and 25b serve as buffer storage to regulate the intervals of output frames so that they will be sent out at 30 Hz.

As described above, the video format converter 1 of the present invention uses frame interpolation techniques to obtain a new frame frequency. That is, the video format converter 1 is designed to adaptively generate interpolated frames from the first video signal by considering motion vectors obtained therefrom. A second video signal is produced from the interpolated frames, so that it will have a different frame frequency. Accordingly, the video format converter 1 of the present invention provides smooth motion in a scene, eliminating discontinuity in a frame sequence, which could be introduced in the process of frame frequency conversion.

The following section will now describe a video format conversion method according to the present invention. FIG. 17 is a flowchart showing a process to convert from a first video signal in a first video format to a second video signal in a second video format that is incompatible with the first video format. The process comprises the following steps:

(S1) Interpolated frames are produced from the first video signal by using motion vectors of the first video signal.

(S2) The second video signal is produced from the interpolated frames.

More specifically, the difference between the two video formats lies in their frame frequencies. That is, the proposed method performs frame interpolation of the first video signal having a first frame rate, thereby generating the second video signal having a second frame frequency.

The above-described embodiments of the present invention is now summarized as follows. According to the present invention, a method and apparatus for converting between different video formats are proposed. They produce interpolated frames from a first video signal, and from these interpolated frames, generate a second video signal that is incompatible with the first video signal. With appropriate frame interpolation techniques, the present invention promises smooth video motion in visual communications between remote users of different television systems, eliminating unnatural effects which could be introduced in the process of video format conversion.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus to convert a first video signal in a first video format to a second video signal in a second video format that is incompatible with the first video format, comprising:

a frame interpolator that produces a plurality of interpolated frames from the first video signal by using motion vectors obtained therefrom, the plurality of interpolated frames being derived from different combinations of consecutive frames of the first video signal;

a switch that selects one of the plurality of interpolated frames to produce the second video signal;

a plurality of difference detectors that detect differences between the consecutive frames of the first video signals; and a switching controller that finds a change in the first video signal by examining the differences detected by the difference detectors and controls the switch to choose such interpolated frames that are derived only from correlated source frames before the change or after the change in the first video signal.

2. The apparatus according to claim 1, wherein the frame interpolator produces a plurality of frames by using the motion vectors for motion compensation, multiplies the produced frames by weighting coefficients, obtains weighted sums by adding the weighted frames, and outputs the weighted sums as the interpolated frames.

3. The apparatus according to claim 1, wherein the frame interpolator uses forward-reference motion vectors and backward-reference motion vectors as the motion vectors.

4. The apparatus according to claim 1, wherein the frame interpolator produces the interpolated frames, while switching between still picture mode and motion picture mode.

5. The apparatus according to claim 1, wherein:

the first video format has a first frame frequency; and the second video format has a second frame frequency that is different from the first frame frequency.

6. The apparatus according to claim 1, wherein the change in the first video signal includes a scene change.

7. The apparatus according to claim 1, wherein the change in the first video signal includes a common format switchover.

8. A method for converting a first video signal in a first video format to a second video signal in a second video format that is incompatible with the first video format, comprising:

producing a plurality of interpolated frames from the first video signal by using motion vectors obtained therefrom, the plurality of interpolated frames being derived form different combinations of consecutive frames of the first video signal;

detecting differences between the consecutive frames of the first video signal; and finding a change in the first video signal by examining to differences detected;

when no change is detected, selecting one of the interpolated frames to produce the second video signal; and when the change is detected, selecting one of the interpolated frames that are derived only from the correlated source frames before the change or after the change in the first video signal.

9. The method according to claim 8, wherein:

the first video format has a first frame frequency; and the second video format has a second frame frequency that is different from the first frame frequency.

10. The method of claim 8, wherein the change in the first video signal includes a scene change.

11. The method of claim 8, wherein the change in the first video signal includes a common format switchover.

* * * * *

UNITED STATES PATENT AND TRADEMARK OFFICE
CERTIFICATE OF CORRECTION

PATENT NO.    : 6,778,221 B1
DATED         : August 17, 2004
INVENTOR(S)   : Yoshihiro Nishioka et al.

It is certified that error appears in the above-identified patent and that said Letters Patent is hereby corrected as shown below:

Column 14,
Line 11, change "form" to -- from --.
Line 15, change "to" to -- the --.

Signed and Sealed this

Twenty-third Day of November, 2004

JON W. DUDAS
*Director of the United States Patent and Trademark Office*